(12) United States Patent
Park

(10) Patent No.: US 8,410,634 B2
(45) Date of Patent: Apr. 2, 2013

(54) GRID-CONNECTED POWER STORAGE SYSTEM AND METHOD FOR CONTROLLING GRID-CONNECTED POWER STORAGE SYSTEM

(75) Inventor: Jong-Ho Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 328 days.

(21) Appl. No.: 12/841,023

(22) Filed: Jul. 21, 2010

(65) Prior Publication Data
US 2011/0133558 A1 Jun. 9, 2011

(30) Foreign Application Priority Data
Dec. 3, 2009 (KR) .................. 10-2009-0119106

(51) Int. Cl.
*H02J 7/00* (2006.01)
(52) U.S. Cl. ............................................. 307/65
(58) Field of Classification Search ............... 307/65
See application file for complete search history.

(56) References Cited

U.S. PATENT DOCUMENTS

| 7,786,616 B2 * | 8/2010 | Naden et al. .................. 307/64 |
| 7,969,043 B2 * | 6/2011 | Caraghiorghiopol et al. .. 307/82 |
| 2008/0101101 A1 | 5/2008 | Iwata et al. |

FOREIGN PATENT DOCUMENTS

| JP | 2000-312445 | 11/2000 |
| JP | 2002-369406 | 12/2002 |
| JP | 2006-099292 | 4/2006 |
| JP | 2009-033802 | 2/2009 |
| KR | 20-0355140 Y1 | 7/2004 |
| KR | 10-0454896 | 10/2004 |
| KR | 1020050001286 A | 1/2005 |
| KR | 1020050021409 A | 3/2005 |

OTHER PUBLICATIONS

KIPO Office action dated Mar. 18, 2011, for Korean priority Patent application 10-2009-0119106, noting listed references in this IDS.
English machine translation of Japanese Publication 2009-033802, listed above, 47 pages.
Japanese Office action dated Jul. 24, 2012, for corresponding Japanese Patent application 2010-220820, (2 pages).
Patent Abstracts of Japan, and English machine translation of Japanese Publication 2000-312445 listed above, (12 pages).
Patent Abstracts of Japan, and English machine translation of Japanese Publication 2002-369406 listed above, (24 pages).
Patent Abstracts of Japan, and English machine translation of Japanese Publication 2006-099292 listed above, (30 pages).

* cited by examiner

*Primary Examiner* — Robert L. Deberadinis
(74) *Attorney, Agent, or Firm* — Christie, Parker & Hale, LLP

(57) ABSTRACT

A grid-connected power storage system for coupling a power generation system to a grid, including: a main battery for discharging stored power to the load system; at least one additional battery coupled to the main battery for discharging stored power to the load system; a bidirectional converter coupled to the main and additional batteries, and including a plurality of switches for performing a conversion between a DC link voltage, between the power generation system and the grid, and a battery voltage, a first switch of the plurality of switches corresponding to the main battery and a second switch of the plurality of switches corresponding to the additional battery, wherein the first and second switches are connected to each other in parallel; and an integrated controller for selectively controlling operations of the first switch and the second switch based on an amount of power used by the load system.

9 Claims, 5 Drawing Sheets

GRID-CONNECTED POWER STORAGE SYSTEM AND METHOD FOR CONTROLLING GRID-CONNECTED POWER STORAGE SYSTEM

CROSS-REFERENCE TO RELATED APPLICATION

This application claims priority to and the benefit of Korean Patent Application No. 10-2009-0119106, filed on Dec. 3, 2009, in the Korean Intellectual Property Office, the entire content of which is incorporated herein by reference.

BACKGROUND

1. Field

One or more aspects of embodiments of the present invention relate to a grid-connected power storage system for connecting a power generation system to a grid to supply power to a load system and a method for controlling the grid-connected power storage system, and more particularly, to a grid-connected power storage system with increased capacity and a method for controlling the grid-connected power storage system.

2. Description of Related Art

The importance of new-renewable power has been recognized as changes occur in domestic and overseas environments. New-renewable power has been recognized as a solution to both an exhaustion problem of fossil fuel and an environmental problem of using the fossil fuel to produce power.

In particular, a photovoltaic generation system for generating power by using solar power does not generate pollutant, and is easily installed and maintained. Thus, the photovoltaic generation system has been spotlighted. Such a photovoltaic generation system can be classified as either an independent generation system which operates independently, or a grid-connected generation system which operates in connection with a commercial power grid. Internal circuit elements of a converter and an inverter constituting a photovoltaic generation system are determined according to a rated voltage or a rated current which has been set when the photovoltaic generation system is designed. Since a capacity of a photovoltaic generation system is fixed in this case, an additional system is to be installed when the capacity of the photovoltaic generation system is increased. Therefore, it is difficult to ensure a space and power of the photovoltaic generation system.

SUMMARY

An aspect of an embodiment of the present invention is directed toward a grid-connected power storage system for reducing a space and improving a power consumption thereof and expanding a capacity thereof.

An embodiment of the present invention provides a grid-connected power storage system for coupling a power generation system to a grid to supply power to a load system, including: a main battery for discharging stored power to the load system; at least one additional battery coupled to the main battery for discharging stored power to the load system; a bidirectional converter coupled to the main and additional batteries, and including a plurality of switches for performing a conversion between a DC link voltage, between the power generation system and the grid, and a battery voltage, a first switch of the plurality of switches corresponding to the main battery and a second switch of the plurality of switches corresponding to the additional battery, wherein the first and second switches are connected to each other in parallel; and an integrated controller for selectively controlling operations of the first switch and the second switch based on an amount of power used by the load system.

The integrated controller may include: a monitoring system for detecting an amount of power utilized by the load system to determine whether the detected amount exceeds a reference amount of power; a battery controller for determining whether the additional battery is to be coupled to the main battery when the detected amount exceeds the reference amount of power; and a switch controller for generating a control signal for controlling driving of the second switch.

The grid-connected power storage system may further include a battery management system coupled to the main battery and the additional battery to control charging and discharging of the main and additional batteries.

The grid-connected power storage system may further include a bidirectional inverter for converting the DC link voltage output from the bidirectional converter into an AC voltage of the grid and the AC voltage of the grid into the DC link voltage.

The grid-connected power storage system may further include a manual operating switch including a mechanical contact for coupling the additional battery to the bidirectional converter.

The power generation system may include a solar cell.

Another embodiment of the present invention provides a method of controlling a grid-connected power storage system which couples a power generation system to a grid to supply power to a load system, the method including: determining whether an additional battery is to be coupled to a main battery based on an amount of power utilized by the load system; and outputting a control signal to a bidirectional converter when the additional battery is to be coupled to the main battery, wherein the bidirectional converter includes a first switch corresponding to the main battery and a second switch corresponding to the additional battery, and wherein the first and second switches are coupled to each other in parallel.

The determination whether the additional battery is to be coupled to the main battery may include: detecting an amount of power utilized by the load system; determining whether the detected amount exceeds a reference amount of power; and determining that the additional battery is to be coupled to the main battery when the detected amount exceeds the reference amount of power.

The method may further include converting a DC link voltage of the bidirectional converter into an AC voltage of the grid.

The power generation system may include a solar cell.

The control signal may operate the second switch.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Figure 1:
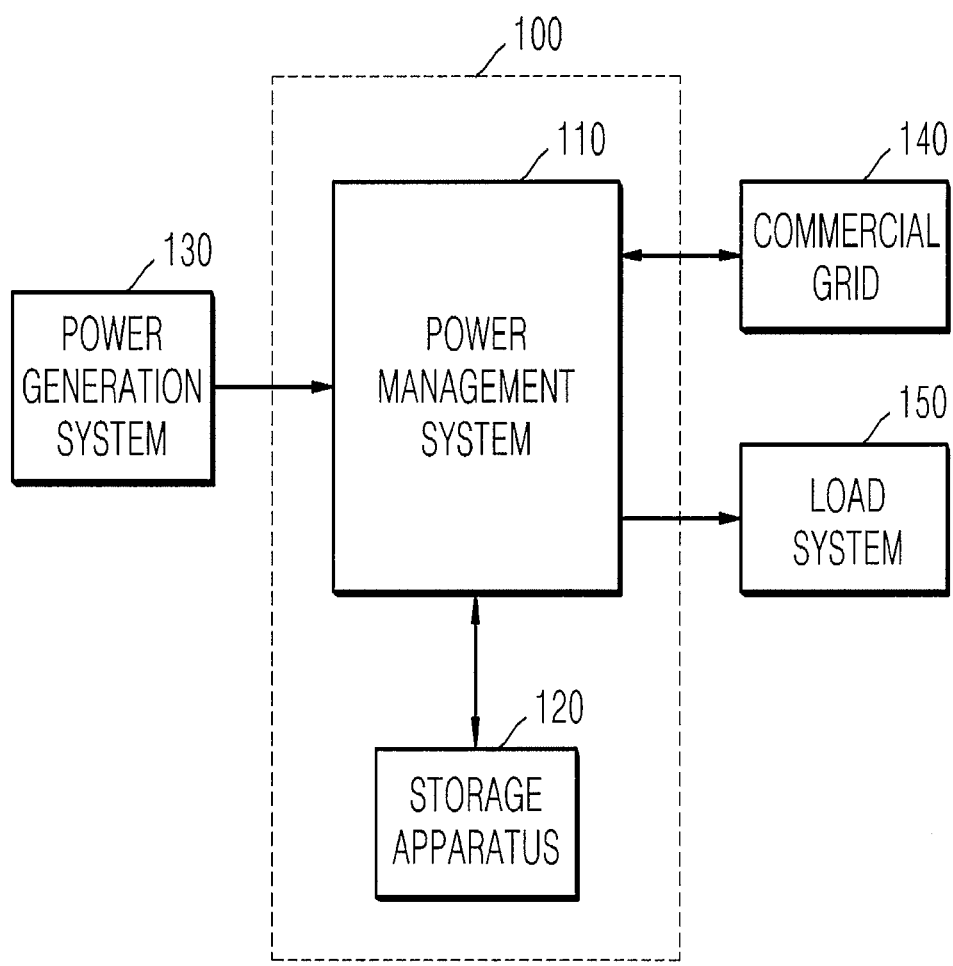
FIG. 1 is a schematic block diagram of a grid-connected power storage system according to an embodiment of the present invention.

FIG. 1 is a schematic block diagram of a grid-connected power storage system 100 according to an embodiment of the present invention.

Referring to FIG. 1, the grid-connected power storage system 100 includes an power management system 110 and a storage apparatus 120, and couples a power generation system 130 to a grid (or commercial grid) 140 in order to supply power to a load system 150.

The power management system 110 receives power from the power generation system 130 and transmits the power to the grid 140, stores the power in the storage apparatus 120, or supplies the power to the load system 150. Here, the generated power is direct current (DC) power or alternating current (AC) power.

The power management system 110 stores power received from the power generation system 130 in the storage apparatus 120 or supplies the power to the grid 140. The power management system 110 transmits power stored in the storage apparatus 120 to the grid 140 and stores power supplied from the grid 14 in the storage apparatus 120.

The power management system 110 performs a power conversion for storing power generated by the power generation system 130 in the storage apparatus 120 and a power conversion for supplying the generated power to the grid 140 or the load system 150. The power management system 110 also performs a power conversion for storing power supplied from the grid 140 in the storage apparatus 120 and a power conversion for supplying power stored in the storage apparatus 120 to the grid 140 or the load system 150. The power management system 110 monitors states of the storage apparatus 120, the grid 140, and the load system 150 in order to distribute power generated by the power generation system 130 or power supplied from the grid 140.

The storage apparatus 120 is a large capacity storage apparatus which stores power supplied from the power management system 110. Here, the supplied power is power generated by the power generation system 130 and converted by the power management system, or commercial power supplied from the grid 140 and converted by the power management system 110. Power stored in the storage apparatus 120 is supplied to the grid 140 or the load system 150 according to the control of the power management system 110. The storage apparatus 120 includes a main storage unit which has a capacity corresponding to an initially set amount and one or more additional storage units which are added to expand a capacity of the grid-connected energy storage system 100 according to an amount of power used by the load system 150.

The power generation system 130 is a system which generates electric power by using a power source. The power generation system 130 generates electric power and outputs the electric power to the grid-connected power storage system 100. The power generation system 130 is a photovoltaic generation system, a wind generation system, a tidal power generation system, or a power generation system which generates electric power by using renewable power, for example, solar heat or geothermal heat. In particular, a solar cell generates electric power using sunlight and is easily installed in homes, factories, or the like, and thus is applied to the grid-connected power storage system 110, which is distributed in homes.

The grid 140 may include a power plant, a substation, a power line, and the like. If the grid 140 operates normally, the grid 140 supplies power to the grid-connected power storage system 100 or the load system 150, and receives power from the grid-connected power storage system 100. If the grid 140 operates abnormally, the grid 140 is stopped from supplying power via the grid-connected power storage system 100 to the load system 150, and/or is stopped from receiving power via the grid-connected power storage system 100.

The load system 150 consumes power supplied from the storage apparatus 120 or the grid 140, and may be a home, a factory, or the like.

Figure 2:
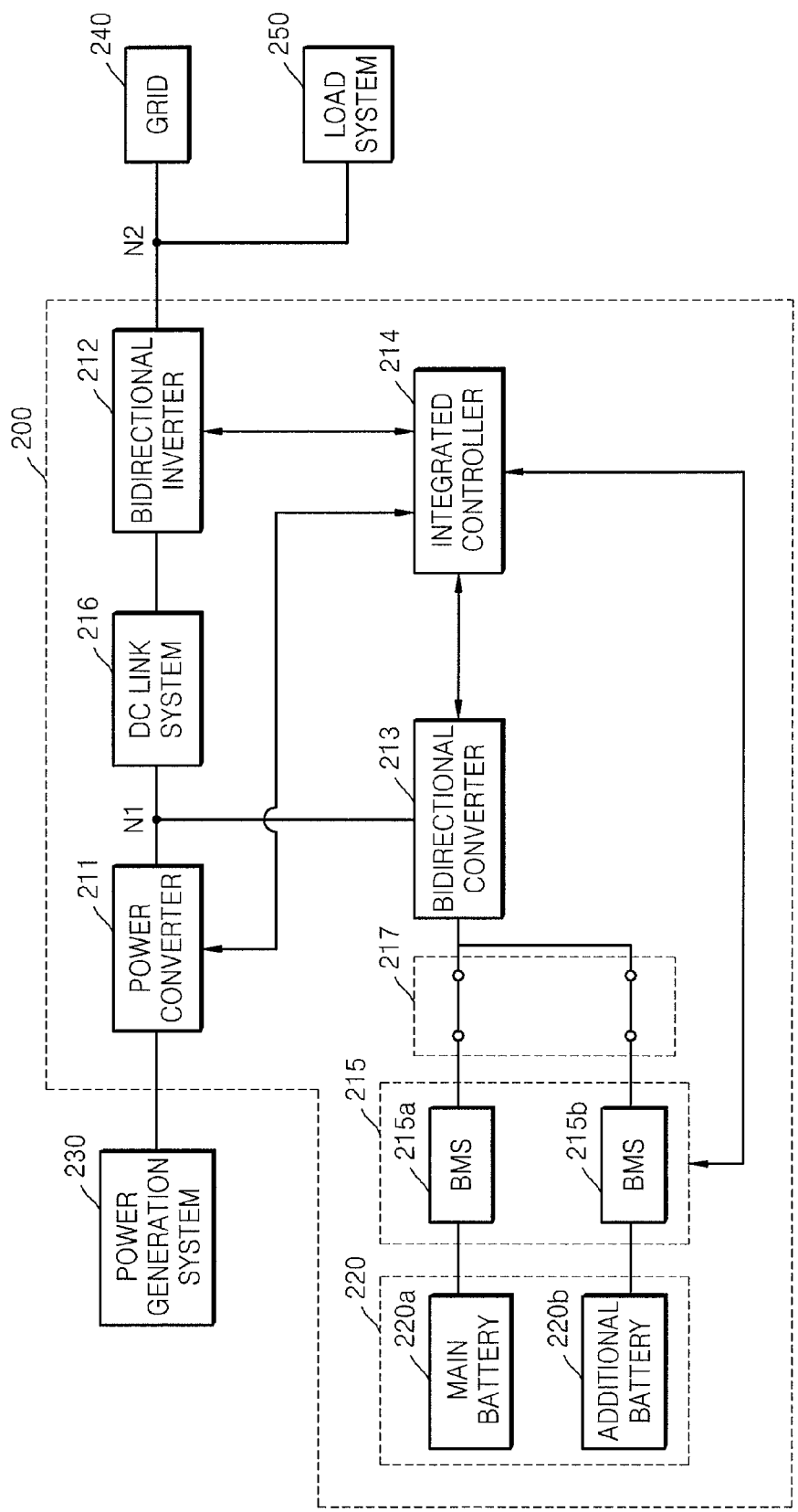
FIG. 2 is a detailed block diagram of the grid-connected power storage system of FIG. 1, according to an embodiment of the present invention.

FIG. 2 is a detailed block diagram of a grid-connected power storage system 200 according an embodiment of the present invention.

Referring to FIG. 2, the grid-connected power storage system 200 (hereinafter referred to as a power storage system) includes a power converter 211, a bidirectional inverter 212, a bidirectional converter 213, an integrated controller 214, a battery management system (BMS) 215, and a direct current (DC) link system 216. The power storage system 200 is connected to a power generation system 230, a grid 240, and a load system 250.

The power converter 211 is connected between the power generation system 230 and a first node N1, and converts a voltage output from the power generation system 230 into a DC link voltage of the first node N1. The operation of the power converter 211 varies with type of the power generation system 230. If the power generation system 230 is a wind generation system or a tidal power generation system that outputs an alternating current (AC) voltage, the power converter 211 rectifies the AC voltage output by the power generation system 230 into the DC link voltage of the first node N1. If the power generation system 230 is a solar cell or the like that outputs a DC voltage, the power converter 211 converts the DC voltage output by the power generation system 230 into the DC link voltage of the first node N1. For example, if the power generation system 230 is a solar cell, the power converter 211 is a maximum power point tracker (MPPT) converter which converts a DC voltage output from the solar cell into the DC link voltage of the first node N1, and which uses an MPPT algorithm for tracking a maximum power voltage according to changes in solar irradiance, temperature, and the like. The MPPT converter performs a boost DC-DC converter function for boosting the DC voltage output from the solar cell and outputting the boosted DC voltage and/or performs an MPPT control function.

The DC link system 216 is coupled between the first node N1 and the bidirectional inverter 212 to maintain the DC link voltage of the first node N1 at a DC link level. The DC link voltage of the first node N1 may become unstable due to an instantaneous voltage sag of the power generation system 230 or the grid 240, a peak load generated by the load system 250, and/or the like. However, the DC link voltage of the first node N1 is stabilized in order to normally operate the bidirectional converter 213 and the bidirectional inverter 212. The DC link system 216 is installed to stabilize the level of the DC link voltage of the first node N1, and may be composed of a capacitor or the like. The capacitor is an electrolytic capacitor, a polymer capacitor, a multilayer ceramic capacitor (MLCC), or the like. The DC link system 216 is separately installed in the current embodiment, but the present invention is not thereby limited. For example, a DC link system instead may be realized as a part inside the bidirectional converter 213, the bidirectional inverter 212, or the power converter 211.

The bidirectional inverter 212 is a power converter which is connected between the first node N1 and the grid 240. The bidirectional inverter 212 rectifies an AC voltage input from the grid 240 into a DC voltage which is to be stored in a battery 220. The bidirectional inverter 212 converts the DC voltage output from the power generation system 230 or the battery 220 into an AC voltage, and outputs the AC voltage to the grid 240. The bidirectional inverter 212 includes a filter which removes harmonics from an AC voltage supplied from the grid 240, limits a voltage change range, improves a power factor, removes DC components, and/or protects against transient phenomena.

The bidirectional converter 213 is a power converter which is coupled between the first node N1 and the battery 220. The bidirectional converter 213 converts a DC link voltage of the first node N1 into a DC voltage which is to be stored in the battery 220, and a DC voltage stored in the battery 220 into a DC link voltage which is to be transmitted to the first node N1. For example, if the bidirectional converter 213 charges the battery 220 with DC power generated by the power generation system 230 or AC power supplied from the grid 240, the bidirectional converter 213 operates as a buck converter which reduce the DC link voltage of the first node N1 into a battery storage voltage. If the bidirectional converter 213 supplies the grid 240 or the load system 250 with power charged in the battery 220, the bidirectional converter 213 operates as a boost converter which boosts the battery storage voltage to the DC link voltage of the first node "N1." The bidirectional converter 213 includes a switching device (hereinafter referred to as a switch) for performing a conversion between a battery storage voltage and a DC link voltage. The switch may be one or more switches. For example, the switch may include a switch or a group of switches corresponding to a main battery and a switch or a group of switches corresponding to one or more additional batteries. In one embodiment, if the switch includes a plurality of switches, the switches are coupled to one another in parallel and have the same capacitances to prevent damage (or to reduce the likelihood of damage). The switches may each be a field effect transistor (FET), a bipolar junction transistor (BJT), or the like. The bidirectional converter 213 predicts a maximum power amount of a load system in order to determine a number of switches or groups of switches to correspond the switches or groups of switches to a number of additional batteries, in advance. The bidirectional converter 213 performs a switching operation through a selection of a switch or a group of switches corresponding to the battery that electrically discharges, according to a control signal of the integrated controller 214. Thus, if an amount of power used by the load system 250 exceeds a reference amount of power, a switching device corresponding to an added battery operates without having to install an additional power storage system, thereby easily increasing an amount of power that is to be supplied. The bidirectional converter 213 will be described in more detail later with reference to FIGS. 4A and 4B.

The battery 220 stores power supplied from the power generation system 230 or the grid 240. The battery 220 includes a main battery 220a and an additional battery 220b which discharge the stored power. Battery cells of each of the main and additional batteries 220a and 220b are coupled in series or in parallel in order for the battery 220 to have increased capacity and power. The capacities of the main and additional batteries 220a and 220b may be the same. The main and additional batteries 220a and 220b are realized as any of various suitable types of battery cells, e.g., nickel-cadmium batteries, aluminum batteries, nickel metal hydride (NiMH) batteries, lithium ion batteries, lithium polymer batteries, or the like. The main and additional batteries 220a and 220b are installed in the current embodiment, but one or more additional batteries may be coupled to one another in order to increase the capacity of the battery 220 according to an amount of power used by the load system 250. For example, if power supplied from the power generation system 230 and/or the grid 240 is less than the amount of power used by the load system 250, power may be supplied from the main battery 220a to the load system 250 in order to compensate for the shortage of power. If power discharged from the main battery 220a is insufficient to compensate for the shortage of power, power may be further supplied from the additional battery 220b to the load system 250. The number of added batteries is determined according to an amount of useable power which is to be replenished. The main and additional batteries 220a and 220b are coupled to the bidirectional converter 213 through the BMS 215, and mechanically and electrically attached to the power storage system 200 through a connector 217. The connector 217 may be a manual operating switch having a mechanical contact. The connector 217 may be coupled only to the additional battery 220, but may also be coupled to the main battery 220a. If the connector 217 is coupled to both the main and additional batteries 220a and 220b, the connector 217 is selectively opened and/or closed to prevent or protect from a backflow of power into the additional battery 220b or the main battery 220a when the main battery 220a or the additional battery 220b discharges power, respectively.

The BMS 215 is coupled to the battery 220 and controls charging and discharging operations of the battery 220 according to the integrated controller 214. The battery 220 discharges power to the bidirectional converter 213 through the BMS 215, and the bidirectional converter 213 charges the battery 220 with power through the BMS 120. The BMS 215 performs an over-charge protection function, an over-discharge protection function, an over-current protection function, an over-voltage protection function, an over-heat protection function, a cell balancing function, and the like in order to protect the battery 220. Thus, the BMS 215 monitors a voltage, a current, a temperature, a residual amount of power, a lifespan, and the like, of the battery 220, and transmits related information to the integrated controller 214. The BMS 215 includes a BMS 215a which is coupled to the main battery 220a and a BMS 215b which is coupled to the additional battery 220b. The BMSs 215a and 215b are respectively coupled to the main and additional batteries 220a and 220b (on a one-to-one basis). The BMS 215 is separated from the battery 220 in the current embodiment, but may be constituted in a battery pack into which the BMS 215a and the main battery 220a are integrally provided as a single body, and the BMS 215b and the additional battery 220b are integrally provided as a single body.

The integrated controller 214 monitors states of the power generation system 230 and the grid 240 to control operations of the BMS 215, the bidirectional converter 213, the bidirectional inverter 212, and the power converter 211. The integrated controller 214 also selectively controls an operation of a switch of the bidirectional converter 213 corresponding to the main battery 220a and an operation of a switch of the bidirectional converter 213 corresponding to the additional battery 220b based on an amount of power used by the load system 250.

Figure 3:
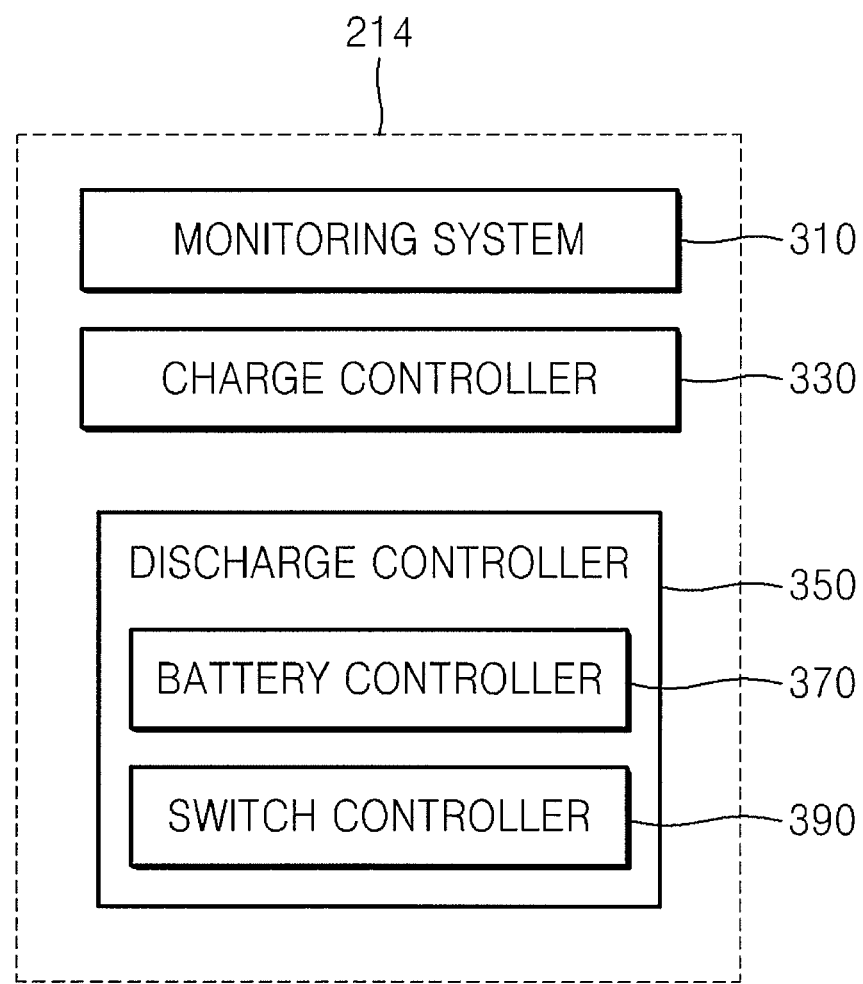
FIG. 3 is a schematic block diagram of an integrated controller of FIG. 2, according to an embodiment of the present invention.

FIG. 3 is a schematic block diagram of the integrated controller 214 of FIG. 2, according to an embodiment of the present invention.

Referring to FIG. 3, the integrated controller 214 includes a monitoring system 310, a charge controller 330, and a discharge controller 350. The integrated controller 214 will now be described with reference to FIGS. 2 and 3.

The monitoring system 310 monitors states of the power generation system 230, the power storage system 200, the grid 240, and the load system 250. The monitoring system 310 monitors a residual amount of power, a voltage, a current, and a temperature of the battery 220 through the BMS 215. When voltages, currents, temperatures, and AC voltages of the bidirectional converter 213, the bidirectional inverter 212, and the power converter 211 are input and/or output, the monitoring system 310 monitors an AC phase. The monitoring system 310 monitors a voltage, a current, a temperature, and an AC phase of the grid 240, and whether the grid 240 is in a normal or abnormal state. The monitoring system 310 detects an amount of power used by the load system 250, and determines whether the detected amount of power exceeds a reference amount of power of the power storage system 200.

The charge controller 330 controls the BMS 215, the bidirectional converter 213, the bidirectional inverter 212, and the power converter 211 in order to store power supplied from the power generation system 230 or the grid 240 in the battery 220. If the battery 220 is charged with power supplied from the grid 240, the bidirectional inverter 212 rectifies an AC voltage supplied from the grid 240 into a DC link voltage of the first node N1 according to a control signal of the charge controller 330. The bidirectional converter 213 converts the DC link voltage of the first node "N1" into a DC voltage of a battery storage voltage level. The converted DC voltage is charged to the battery 220 through the BMS 215. If the battery 220 is charged with power supplied from the power generation system 230, the power converter 211 converts the power supplied from the power generation system 230 into the DC link voltage of the first node "N1", the bidirectional converter 213 converts the DC link voltage into the battery storage voltage, and the battery 220 is charged with the battery storage voltage through the BMS 215 according to a control signal of the BMS 215. A switch of the bidirectional converter 213 corresponding to the battery 220 charged with the battery storage voltage is selected and operated according to a control signal of the charge controller 330.

The discharge controller 350 controls the BMS 215, the bidirectional converter 213, and the bidirectional inverter 212 to supply power stored in the battery 220 to the load system 250 based on the amount of power used by the load system 250. If the battery 220 discharges power to the load system 250, the bidirectional converter 213 converts the battery storage voltage output through the BMS 215 into the DC link voltage, and the bidirectional inverter 212 converts the DC link voltage into an AC voltage of the load system 250 according to a control signal of the discharge controller 350. Therefore, an AC voltage is supplied to the load system 250. The discharge controller 350 includes a battery controller 370 and a switch controller 390. The battery controller 370 compares an amount of power supplied from the power generation system 230 and/or the grid 240 with the amount of power used by the load system 250. If the amount of power used by the load system 250 is greater than the amount of supplied power, the battery controller 370 controls the main battery 220a to discharge power stored in the main battery 220a through the BMS 215. If the amount of power used by the load system 250 is still greater than the amount of supplied power, the battery controller 370 couples the additional battery 220b to discharge power stored in the additional battery 220b. The number of additional batteries is determined according to the amount of maximum power to be supplied to the load system 250. Here, the switch controller 390 outputs a control signal to a parallel-connected switch of the bidirectional converter 213 corresponding to a discharge battery so that a selected switch performs a switching operation. The switch controller 390 outputs a pulse width modulation (PWM) control signal for controlling switching operations of the power converter 211 and the bidirectional inverter 212. The duty cycle of the PWM control signal is controlled according to an input voltage of a converter or an inverter in order to reduce loss of power resulting from a power conversion of the converter or the inverter. Therefore, although an amount of used power is increased, a battery is added into a single power storage system and a corresponding switch of a bidirectional converter selectively operates without having to install an additional power storage system. As a result, a capacity of the single power storage system is increased.

Figure 4A:
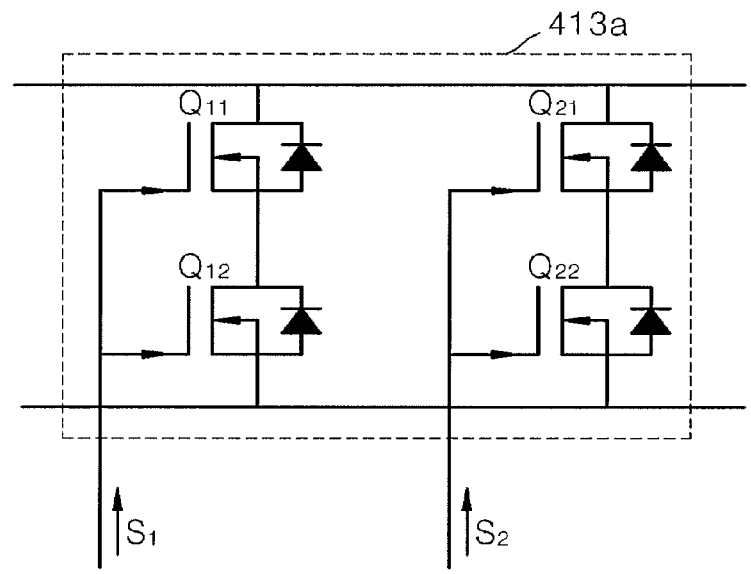
FIG. 4A is a schematic circuit diagram of a bidirectional converter, according to an embodiment of the present invention.
Figure 4B:
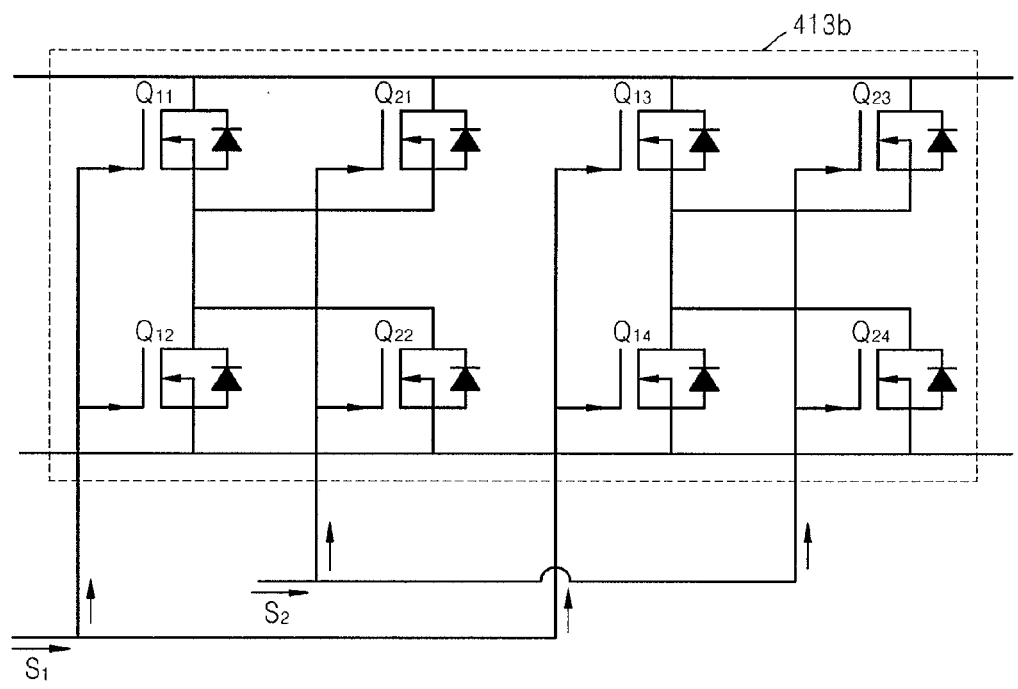
FIG. 4B is a schematic circuit diagram of a bidirectional converter, according to an embodiment of the present invention.

FIGS. 4A and 4B are schematic circuit diagrams of circuits that may be in the bidirectional converter 213, according to embodiments of the present invention. For convenience of description and understanding, only structures of switches are schematically shown.

Referring to FIG. 4A, the bidirectional converter 213 includes a circuit 413a which operates as a decompression-type buck converter when charging, and which operates as a boost converter when discharging. The bidirectional converter 213 includes a charge switch Q11 for converting a DC link voltage into a battery voltage, and a discharge switch Q12 for converting a battery voltage into a DC link voltage in order to charge and discharge the main battery 220a. The bidirectional converter 213 also includes a charge switch Q21 for converting a DC link voltage into a battery voltage, and a discharge switch Q22 for converting a battery voltage into a DC link voltage in order to charge and discharge the additional battery 220b. According to another embodiment of the present invention, functions of the charge switches Q11 and Q21 may be changed with functions of the discharge switches Q12 and Q22. The bidirectional converter 213 drives the charge switch Q11 or discharge switch Q12 according to a main battery control signal S1 input from the integrated controller 214, and drives the charge switch Q21 or discharge switch Q22 according to an additional battery control signal S2.

Referring to FIG. 4B, the bidirectional converter 213 includes a full bridge inverter circuit 413b which controls four FETs, and which performs a conversion between DC and DC voltages by converting from a DC voltage to an AC voltage, boosting or decompressing (bucking) of the AC voltage, and then converting from the boosted or bucked AC voltage to a different DC voltage. The full bridge inverter circuit 413b respectively connects switches Q21, Q22, Q23, and Q24 for charging and discharging the additional battery 220b to an inverter circuit including switches Q11, Q12, Q13, and Q14 for charging and discharging the main battery 220a in parallel. The bidirectional converter 213 drives the switches Q11, Q12, Q13, and Q14 according to a main battery control signal "S1" input from the integrated controller 214, and drives the switches Q21, Q22, Q23, and "Q24" according to an additional battery control signal "S2."

The bidirectional converter 213 is not limited to the above embodiments and may be another type of converter or inverter including switches according to design of a circuit for charging and discharging a battery.

Figure 5:
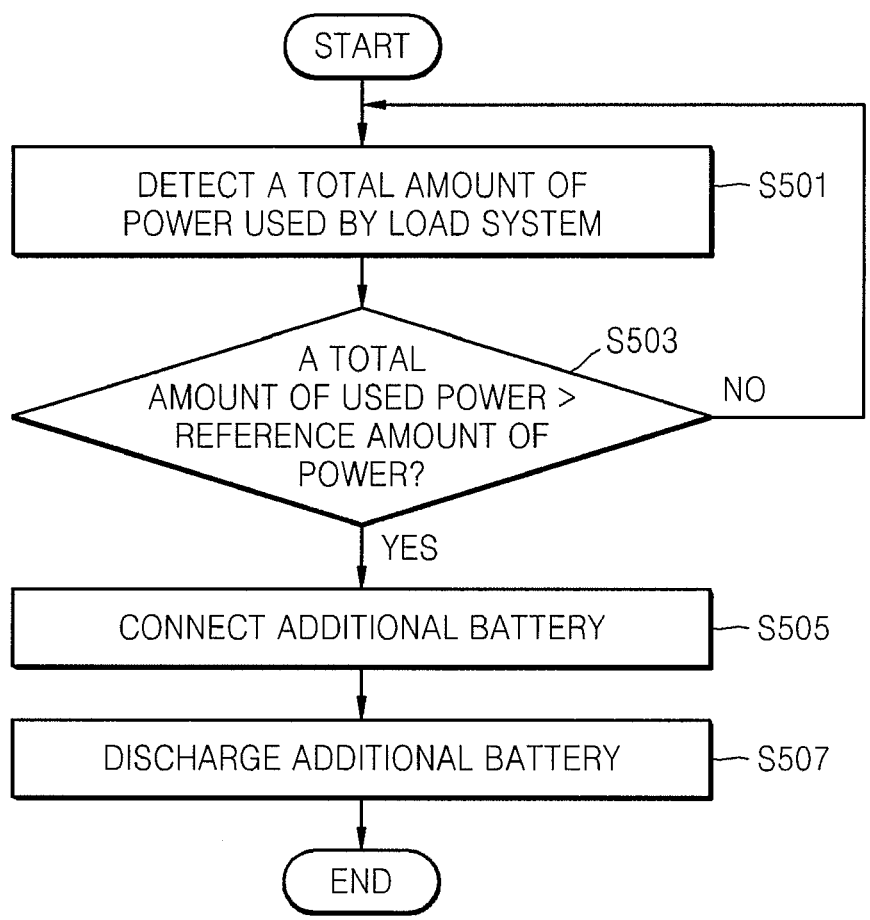
FIG. 5 is a flowchart of a method of controlling a grid-connected power storage system according to an embodiment of the present invention.

FIG. 5 is a schematic flowchart of a method of controlling a power storage system according to an embodiment of the present invention.

Referring to FIG. 5, in operation S501, an integrated controller monitors a load system in order to detect an amount of power used by the load system per unit time.

In operation S503, the integrated controller determines whether the detected amount exceeds a reference amount of power. The reference amount of power is defined as an amount of power which has been initially set in the power storage system including a main battery. If the amount of power used by the load system per unit time is greater than an amount of power supplied from a power generation system and a grid, the integrated controller has the main battery discharge power. If the power discharged from the main battery does not satisfy the amount of power used by the load system per unit time, the integrated controller has an additional battery discharge power.

If the detected amount exceeds the reference amount of power, the additional battery is coupled along with the main battery in operation S505. The additional battery and a BMS are coupled to a bidirectional converter positioned at a following node. If the detected amount does not exceed the reference amount of power, the integrated controller continues monitoring the load system in order to detect the amount of power used by the load system per unit time in operation S501.

In operation S507, the power discharged from the additional battery is supplied to the load system. If the additional battery is coupled, a switch of a bidirectional converter corresponding to the additional battery is selected according to a control signal of the integrated controller, and a battery storage voltage of the additional battery is converted into a DC link voltage through a switching operation of the selected switch. The DC link voltage is converted into an AC voltage of the load system through a bidirectional inverter, and the AC voltage is supplied to the load system.

As described above, according to the one or more of the above embodiments of the present invention, a grid-connected power storage system includes a single bidirectional converter including switches for batteries in an array. Thus, the array of the batteries is driven by the grid-connected power storage system without having to install an additional power storage system in order to increase a capacity of the grid-connected power storage system. As a result, a size of the grid-connected power storage system is reduced, and the capacity thereof is easily expanded.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A grid-connected power storage system for coupling a power generation system to a grid to supply power to a load system, comprising:
   a main battery for discharging stored power to the load system;
   at least one additional battery coupled to the main battery for discharging stored power to the load system;
   a bidirectional converter coupled to the main and additional batteries, and comprising a plurality of switches for performing a conversion between a DC link voltage, between the power generation system and the grid, and a battery voltage, a first switch of the plurality of switches corresponding to the main battery and a second switch of the plurality of switches corresponding to the additional battery, wherein the first and second switches are connected to each other in parallel;
   an integrated controller for selectively controlling operations of the first switch and the second switch based on an amount of power used by the load system; and
   a bidirectional inverter for converting the DC link voltage output from the bidirectional converter into an AC voltage of the grid and the AC voltage of the grid into the DC link voltage,
   wherein the bidirectional inverter is configured to supply power from the power generation system to the grid via the bidirectional inverter.

2. The grid-connected power storage system of claim 1, wherein the integrated controller comprises:
   a monitoring system for detecting an amount of power utilized by the load system to determine whether the detected amount exceeds a reference amount of power;
   a battery controller for determining whether the additional battery is to be coupled to the main battery when the detected amount exceeds the reference amount of power; and
   a switch controller for generating a control signal for controlling driving of the second switch.

3. The grid-connected power storage system of claim 1, further comprising a battery management system coupled to the main battery and the additional battery to control charging and discharging of the main and additional batteries.

4. The grid-connected power storage system of claim 1, further comprising a manual operating switch comprising a mechanical contact for coupling the additional battery to the bidirectional converter.

5. The grid-connected power storage system of claim 1, wherein the power generation system comprises a solar cell.

6. A method of controlling a grid-connected power storage system which couples a power generation system to a grid to supply power to a load system, the method comprising:
   determining whether an additional battery is to be coupled to a main battery based on an amount of power utilized by the load system;
   outputting a control signal to a bidirectional converter when the additional battery is to be coupled to the main battery, wherein the bidirectional converter comprises a first switch corresponding to the main battery and a second switch corresponding to the additional battery, and wherein the first and second switches are coupled to each other in parallel;
   comprising converting a DC link voltage of the bidirectional converter into an AC voltage of the grid; and
   supplying power from the power generation system to the grid.

7. The method of claim 6, wherein the determination whether the additional battery is to be coupled to the main battery comprises:
   detecting an amount of power utilized by the load system;
   determining whether the detected amount exceeds a reference amount of power; and determining that the additional battery is to be coupled to the main battery when the detected amount exceeds the reference amount of power.

8. The method of claim 6, wherein the power generation system comprises a solar cell.

9. The method of claim 6, wherein the control signal operates the second switch.

* * * * *